(12) United States Patent
Mahurin et al.

(10) Patent No.: US 6,535,972 B1
(45) Date of Patent: Mar. 18, 2003

(54) SHARED DEPENDENCY CHECKING FOR STATUS FLAGS

(75) Inventors: Eric W. Mahurin, Austin, TX (US); Michael T. Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/441,631

(22) Filed: Nov. 16, 1999

(51) Int. Cl.[7] ............................ G06F 9/30; G06F 9/40
(52) U.S. Cl. .................. 712/217; 712/245; 712/228; 712/237
(58) Field of Search ..................... 712/240, 217, 712/237, 23, 228, 245; 708/306, 319

(56) References Cited

U.S. PATENT DOCUMENTS

| | | | |
|---|---|---|---|
| 4,507,725 A | * 3/1985 | Christopher et al. | 708/306 |
| 5,452,426 A | * 9/1995 | Papaworth et al. | 712/217 |
| 5,632,023 A | 5/1997 | White et al. | 712/218 |

* cited by examiner

Primary Examiner—Daniel H. Pan
(74) Attorney, Agent, or Firm—Lawrence J. Merkel; Meyertons, Hood, Kivlin, Kowert & Goetzel, P.C.

(57) ABSTRACT

A system and method for shared dependency checking of status flags. In certain instruction set architectures, the reading of some status flags by the instruction set is exclusive, or nearly exclusive, with respect to the reading of other status flags. Hardware for exclusively read flags may be shared in dependency checking circuitry, allowing the reading of either one flag or the other for during dependency checking of a given instruction. This may allow circuit area to be saved. For an instruction that may need access to both flags, system firmware (e.g. microcode) can be used to break the instruction into two separate instructions or operations, thereby allowing the flags to maintain their exclusivity with respect to each other.

20 Claims, 7 Drawing Sheets

1. ADD A, B;

2. ADD A, A;

3. ADD C, D;

4. ADD A, C;

Fig. 1
(Prior Art)

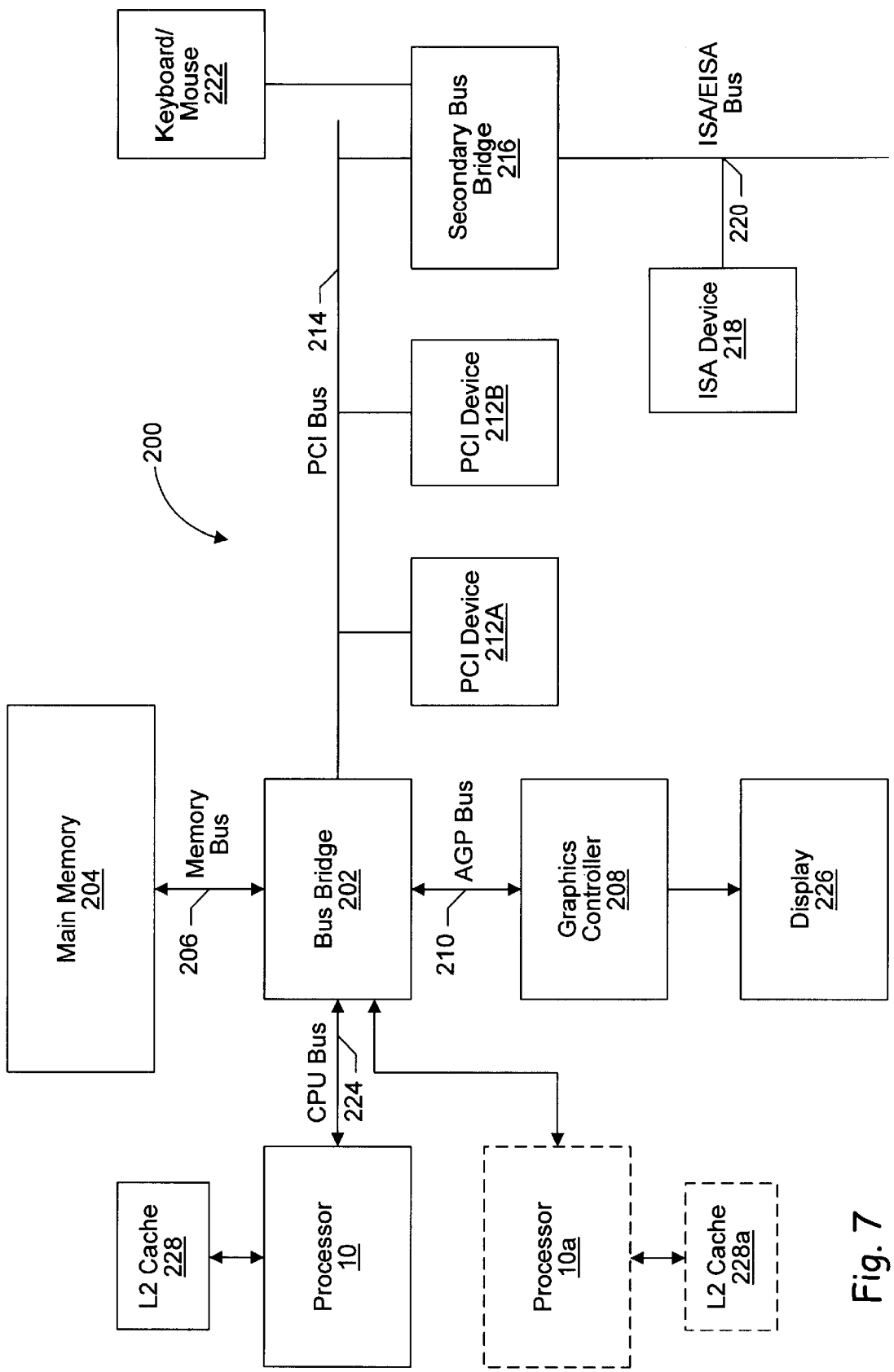

SHARED DEPENDENCY CHECKING FOR STATUS FLAGS

BACKGROUND OF THE INVENTION

1. Field of the Invention

This invention relates to microprocessors, and more specifically, to dependency checking in microprocessors.

2. Description of the Related Art

With recent advances in microprocessors, a number of new architectural features have been implemented for increased performance. One of these features is pipelining, wherein multiple instructions are overlapped in execution. Another architectural feature is to make a superscalar structure having multiple functional (or execution) units. This may allow a microprocessor to execute multiple instructions simultaneously. In some cases, these functional units may be designed to execute specific types of instructions. For example, one functional unit may be designed for integer operations, while another may be designed for floating point operations. Many current microprocessors employ both pipelined and superscalar features. A pipelined superscalar microprocessor running at peak efficiency may execute multiple instructions with each successive clock cycle.

Pipelining generally involves five steps: fetching an instruction, decoding the instruction, fetching the specified operands, executing the instruction, and writing back the results (to registers or memory). Each of these steps may require one or more clock cycles according to the design of a given pipeline. Thus, a pipeline may simultaneously write back the results of an executed first instruction, execute a second instruction, fetch operands for a third instruction, and so on, all within a given clock cycle. Under this ideal situation, a given execution unit may retire an instruction with each clock cycle. However, there are a number of different situations that may prevent the retiring of an instruction with each new clock cycle. In such situations, a delay of several clock cycles may occur between the execution of instructions. Similarly, superscalar microprocessors may experience different situations which delays concurrent execution of multiple instructions.

One situation that may cause a delay of execution in a pipelined and/or superscalar microprocessor involves dependencies between instructions. For example, if operands for a given instruction depend on the results of a previous instruction, the instruction may not be executed until the previous instruction has completed execution. FIG. 1 shows exemplary instructions which illustrate dependencies that may arise during program execution. Instruction #1, the first issued, instructs the processor to add the contents of register A to register B and store the result in register A. Each subsequent instruction follows this same general format. Since instruction #2 requires the processor to fetch both operands from register A, it may not execute until instruction #1 has executed and written its result back into register A. Similarly, instruction #4 cannot execute until the results of instruction #3 have been written back to register C and instruction #2 to register A. Satisfying these dependencies may add a delay between the execution of these instructions.

A technique for dealing with the problem described above is known as out-of-order execution. When this technique is employed, instructions may be executed in an order different from that in which they were issued, providing that program functionality is maintained. Referring again to FIG. 1, instruction #3 orders the processor to add the contents of register C to register D and store the result in register C. Neither instruction #1 nor instruction #2 fetch or store operands in registers C or D. Thus, instruction #3 has no dependencies with respect to instructions #1 and #2. Execution of instruction #3 prior to either instruction #2 or instruction #1 will yield a valid result without compromising program functionality.

A flag is a bit that indicates a condition resulting from the execution of an instruction, and is typically stored in a dedicated register. For example, in an x86 processor, the parity flag (PF) is used to indicate odd or even parity of the result, while the sign flag may be used to indicate the sign of a result of an arithmetic operation. In this architecture, a register referred to as the status register, or EFLAGS register, is used to store flags.

Some microprocessors, in order to perform out-of-order execution, implement a unit known as a reservation station. A typical reservation station may store instructions and their corresponding operands and flags prior to execution. If the operand or flag values are not valid for the corresponding instruction, a tag may be stored instead. The tag is used identify the instruction(s) upon which the dependency is based. Using comparison logic within the reservation station, result tags of executed instructions can be compared with the tag. When a matching tag is detected, the corresponding operand or flag may be captured. Once all stored operands/flag values stored have been provided for the corresponding instruction, the instruction may then be forwarded to a functional unit for execution. While storing larger numbers of instructions in a reservation station allows for more out-of-order execution, the amount of circuitry needed increases as well.

SUMMARY OF THE INVENTION

The problems outlined above are in large part solved by a system and method for shared dependency checking of status flags. In one embodiment, reading of the carry flag and overflow flag as operands is mutually exclusive by the instruction set of an x86 microprocessor, with one exception. Dependency checking hardware for the carry flag and overflow flag is shared. A 2-to-1 multiplexer is used to select the dependency checking result (either the flag or a tag identifying the instruction which updates the flag) depending on which flag is read by the corresponding instruction. The selected flag, or tag corresponding to the flag, may be stored in a reservation station. Comparison logic is present in the reservation station for each stored tag, and is used to check the status of the tag against the values required for instruction execution. Since comparison and storage logic for the carry and overflow flags/tags is shared, the amount of circuitry present in the reservation station may be reduced, thereby saving chip area. Although comparison logic for the flags is shared, the flags may still be independently written into the status register.

In general, the above technique may be applied to any microprocessor architecture in which flags are used. When the reading of a flag as an operand by an instruction set is exclusive, or nearly exclusive, with respect to the reading of another flag, circuitry supporting the reading of these flags may be shared. Execution may be altered for the few instructions that may need to read the flags that are otherwise read exclusively of each other. For example, in the x86 embodiment discussed above, the PUSHF (Push Flags) instruction requires independent reading of both the carry and overflow flags, which are otherwise read exclusively with respect to each other. The PUSHF instruction may be broken down into two instructions by firmware (e.g.

microcode) within the microprocessor, thereby allowing the reading of both flags. In other embodiments, a decode unit may be configured to break down the instruction into two separate operations, thereby allowing both flags to be read for that instruction.

Thus, in various embodiments, the system and method for shared dependency checking of status flags may result in circuit area savings. Since the flags to be shared are not read simultaneously by the same instruction, logic supporting the reading of these flags may be shared for dependency checking. The flags may still be written independent of each other, and thus, the effect on microprocessor operations may be kept to a minimum.

BRIEF DESCRIPTION OF THE DRAWINGS

Other objects and advantages of the invention will become apparent upon reading the following detailed description and upon reference to the accompanying drawings in which:

Figure 1:
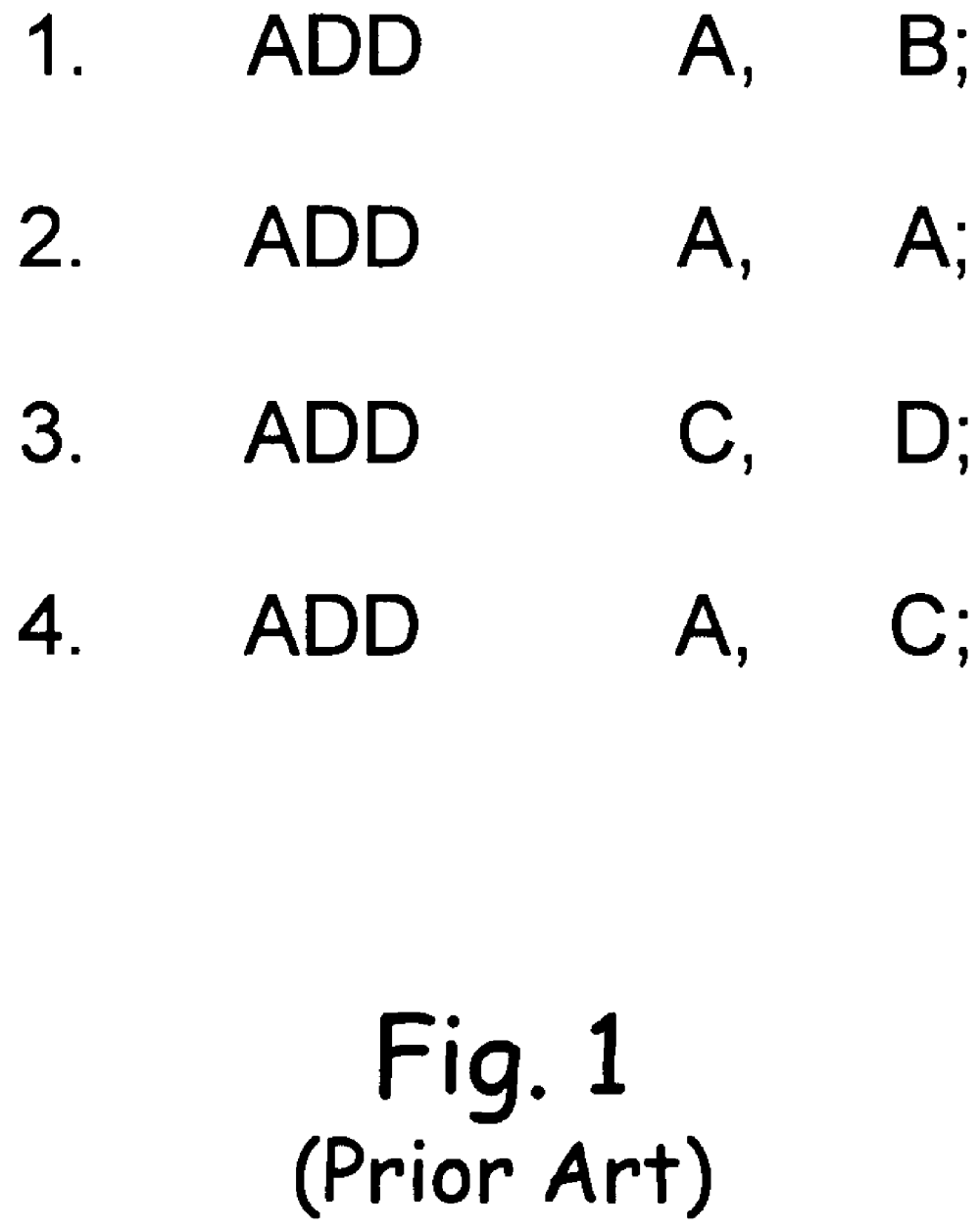

FIG. 1 is an example of a group of instructions, and will be used to illustrate out-of-order execution and dependency checking;

Figure 2:
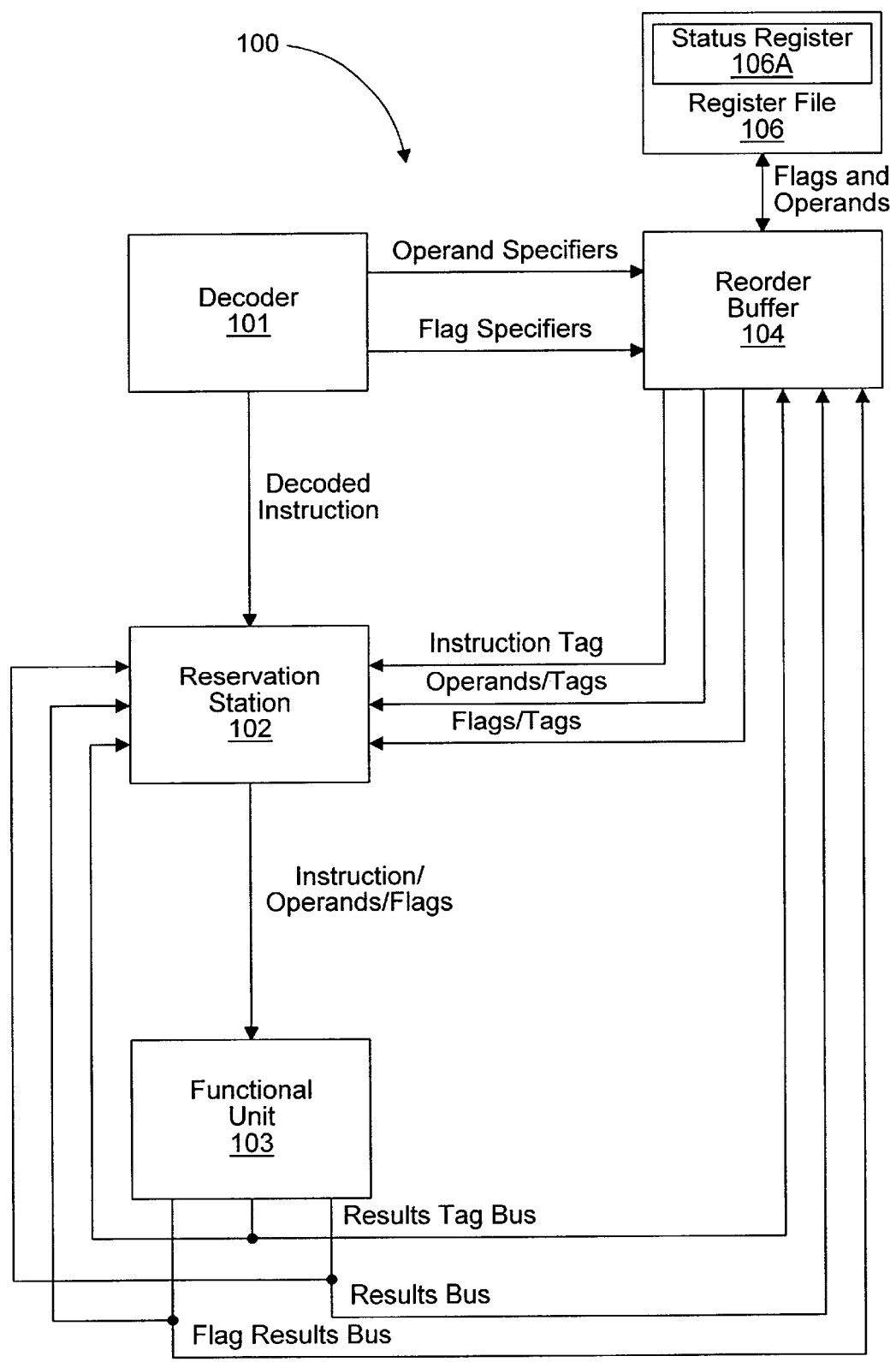
FIG. 2 is a block diagram of a microprocessor core.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scoped of the present invention as defined be the appended claims.

DETAILED DESCRIPTION OF THE INVENTION

Turning now to FIG. 2, a block diagram of one embodiment of a microprocessor core is illustrated. Microprocessor core 100 is configured for out-of-order execution, and implements the shared dependency checking of status flags. Microprocessor core 100 includes decoder 101, a reservation station 102, functional unit 103, reorder buffer 104, and a register file 106 that includes status register 106A. Multiple decoders, functional units, and reservation stations may be present in embodiments that implement a superscalar architecture.

Decoder 101 is configured to decode instructions received from an instruction cache, an instruction alignment unit, or microcode. Once decoded, instructions may then be sent to reservation station 102, where they may be stored until execution. Decoder 101 also forwards operand and flag specifiers to reorder buffer 104. Operand specifiers typically include register address information indicating the location of the requested operand. Information concerning the type of operand, such as floating point, integer, etc., may also be included in the operand specifiers. Flag specifiers indicate those flags which must be read for instruction execution.

Register file 106 includes both general-purpose registers and special-purpose registers. General-purpose registers may be used to store operands prior to instruction execution, and may also store results following instruction execution. Register file 106 also includes status register 106A. Status register 106A stores bits known as flags. In one embodiment, an x86 processor employs a status register, referred to as the EFLAGS register, which stores both status flags and control flags. Control flags include a trap flag (TF), an interrupt flag (IF), and a direction flag (DF). Status flags include a zero flag (ZF), parity flag (PF), auxiliary carry flag (AF), sign flag (SF), carry flag (CF) and overflow flag (OF). These status flags may be used to indicate a condition produced as the result of an executed instruction. For example, the zero flag is set when the result of an arithmetic or logical instruction is a zero, while the sign flag is set to indicate that an arithmetic operation has resulted in a negative number.

Reorder buffer 104 is configured to track the original program sequence for register read and write operations. The reorder buffer may be considered to be two separate units, one including dependency checking logic, and one for storing results of executed instructions, as will be explained in further detail below. Reorder buffer 104 is configured to receive operand and flag specifiers from decoder 101. Operand and flag specifiers provide information on those operands and flags that a given instruction is dependent upon. For example, an operand specifier may indicate a register address for an operand to be used by a given instruction. Reorder buffer 104 may access the register address for the given operand after receiving the operand specifier from decode unit 101.

Reorder buffer 104 is also configured to forward operands, flags, and tags to reservation station 102. Upon receiving operand and flag specifiers from decoder 101, reorder buffer 104 may send either the requested operands/flags to reservation station 102, or tags corresponding to the requested operands/flags. If the requested operands/flags are valid at the time of the request, they may be forwarded to reservation station 102. Otherwise, reorder buffer 104 may forward corresponding tags to reservation station 102. These tags identify those instructions upon which the dependency for each operand and flag is based.

Reservation station 102 is configured to store decoded instructions and their corresponding operands and flags, or corresponding tags when a dependency exists for the instruction. Instructions are stored in reservation station 102 until they are ready for execution. The instructions may be considered ready for execution when all dependencies have been satisfied, i.e. when the valid values for all operands and flags are present in the reservation station. When instructions are ready for execution, they may then be forwarded to functional unit 103. Reservation station 102 includes compare logic in order to determine when dependencies have been satisfied for a given instruction. To this end, reservation station 102 is configured to receive results from functional unit 103 following the execution of an instruction. These results include execution results (e.g. the arithmetic result of an integer operation), and flag results, which indicate flag states resulting from instruction execution, and a result tag which identifies the instruction being executed. Reservation station 102 will be described in further detail below.

Functional unit 103 is configured to execute instructions and to provide results to the various units of the microprocessor. Functional unit 103 is configured to receive instructions from reservation station 102, along with operands and flags required for execution of the received instruction. Functional unit 103 may be configured to execute instructions for a certain type of data, such as floating point or integer, and in various embodiments, multiple functional units may be present. Following the execution of an instruction, functional unit 103 is configured to forward results of the instruction, including flag results, to reorder buffer 104 and reservation station 102. Functional unit 103 is also configured to forward a result tag identifying the executed instruction to reservation station 102 and reorder buffer 104.

Figure 3:
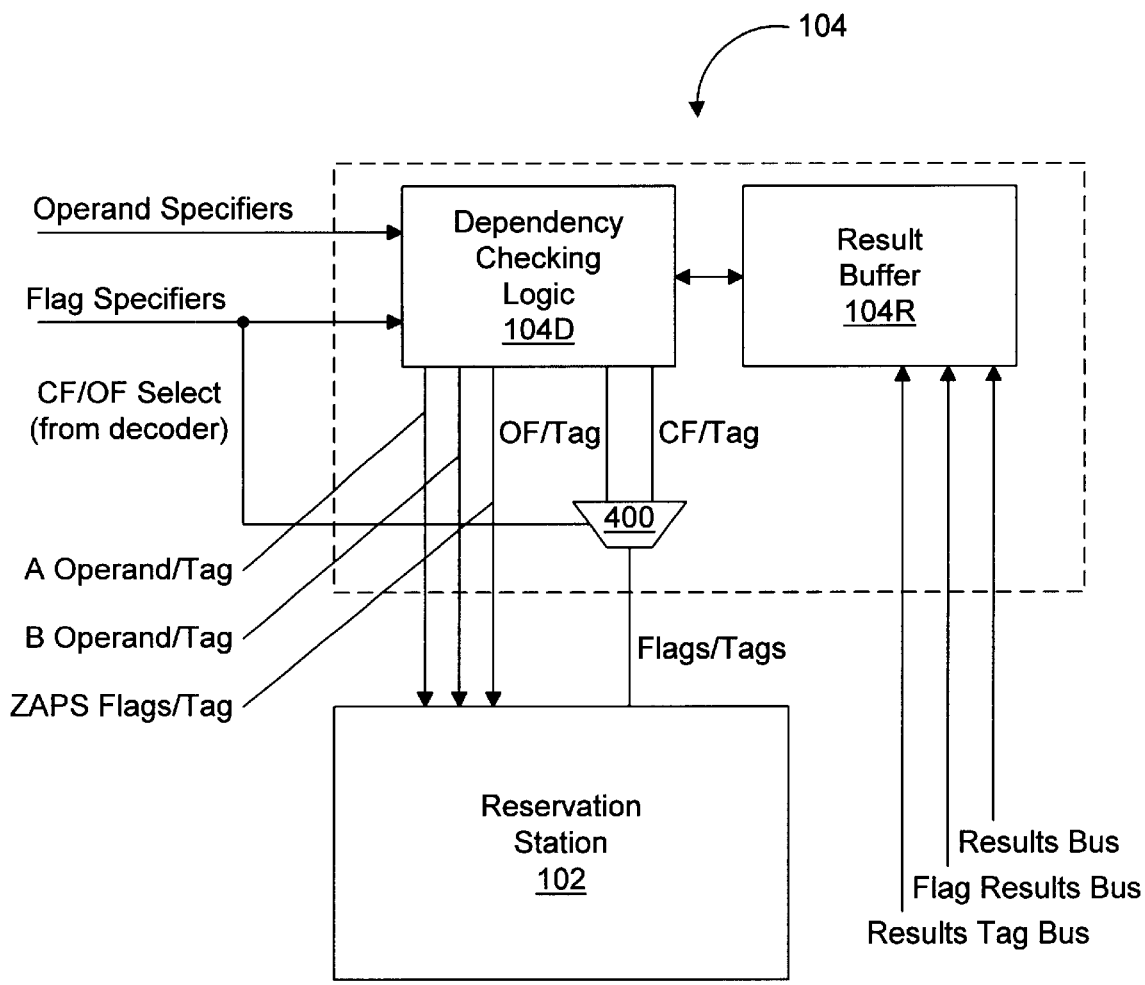
FIG. 3, is a block diagram illustrating the sharing of hardware for the carry and overflow flag.

Moving now to FIG. 3, a block diagram illustrating one embodiment of the sharing of hardware for the carry and overflow flag is shown. The sharing of hardware for dependency checking involving either the carry or overflow flag is implemented in reorder buffer 104 and reservation station 102 in this embodiment. Other embodiments that employ a scheduler, future file hardware, or other hardware configurations are possible and contemplated. Reorder buffer 104 includes dependency checking logic 104D and result buffer 104R. Dependency checking logic 104D is configured to receive operand and flag specifiers from decode unit 101 of FIG. 2. Dependency checking logic 104D is configured to determine if any dependencies exist for the specified flags and operands, as well as determining upon which instructions those dependencies are based. Flag specifiers may be used as an indication of the flags required for execution of a given instruction. In the embodiment shown, the flag specifiers include a signal line for conveying signals indicating the requirement of reading either the carry or overflow flag for a given instruction. These signals are used to select the requested flag, or corresponding tag, at multiplexer 400. Multiplexer 400 is configured to receive the carry and overflow flags and corresponding tags. Depending on the instruction, either the carry flag (or tag) or overflow flag (or tag) is selected for forwarding to reservation station 102 as part of the flags/tags shown in the FIG. 3. Dependency checking logic 104D further provides the remaining flags/tags and operands/tags as well. These include the A operand/tag, the B operand/tags, and the ZAPS flags/tag, as shown in the drawing.

Results buffer 104R is configured to receive results from functional unit 103 of FIG. 2. The results bus is configured to convey results of an executed instruction, such as a product of a multiplication to results buffer 104R. Similarly, the flag results bus conveys flag results, and a results tag bus conveys results tags to results buffer 104R. Results buffer 104R is coupled to register file 106 of FIG. 2. Flag results from executed instructions may be committed to the register file from results buffer 104R in the intended order of execution.

Figure 4:
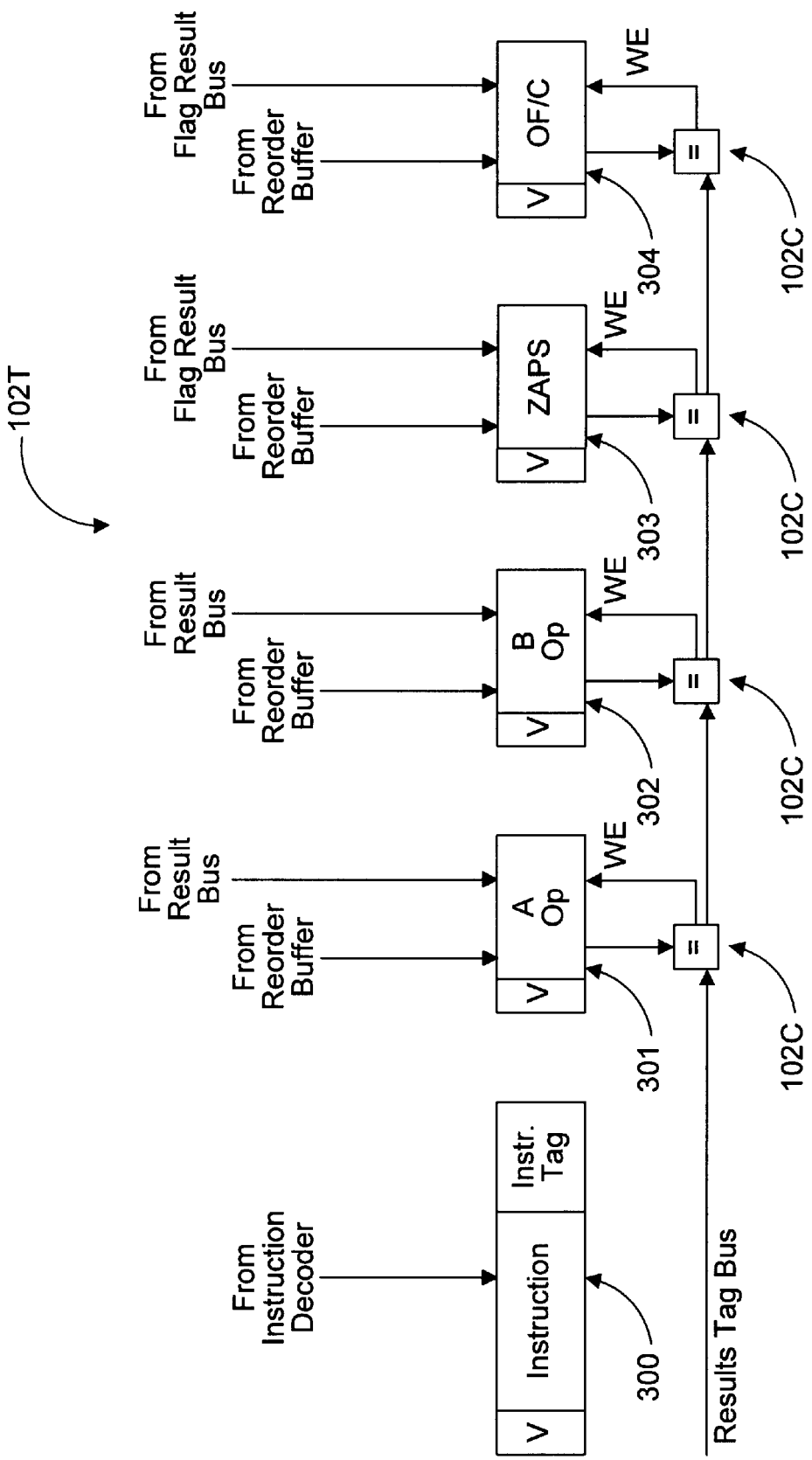
FIG. 4 is an illustration of a storage location in a reservation station.

Moving on to FIG. 4, an illustration of one embodiment of a storage location 102T in a reservation station is shown, and further illustrates the sharing of hardware for the carry and overflow flag. Storage location 102T is configured to store a decoded instruction 300 (received from decoder 101 of FIG. 2), as well as A operand 301, B operand 302, ZAPS (zero, auxiliary, parity, sign) flags 303, and overflow/carry flag 304. Storage location 102T is configured to store tags instead of the operands/flags in those cases where the required values are not yet available due to an unsatisfied dependency. The tags are used to indicate the instruction upon which the correct value of the operand/tag is dependent. Each storage location, with the exception of that for the instruction, includes a comparator 102C for each operand/flag. During the execution of an instruction, functional unit 103 of FIG. 2 is configured to forward a results tag, indicating the instruction being executed, on the results tag bus. This indication is then compared by comparators 102C for each stored tag. If a match occurs at a given comparator, a write enable signal (designated WE) is asserted, allowing the correct value of the respective operand or flag to be written into its corresponding location. The operands or flags may be received from reorder buffer 104 of FIGS. 2 and 3 during the dispatch of an instruction to reservation station 102, otherwise the operands and flags may be received from either the results bus or flags results bus. In superscalar embodiments, additional comparators may be present for each operand/flag. For example, in one embodiment (to be described below) includes three functional units and a load/store unit. Each functional unit may convey a result to the results bus, and the load/store unit may convey two results to the results bus. Therefore, a storage location 102T may have up to five comparators for each operand/flag.

Storage location 102T is also configured to store an instruction tag along with instruction 300. This instruction tag becomes the result tag when the instruction is executed. This result tag is then forwarded via the results tag bus to reorder buffer 104 and reservation station 102, shown in FIGS. 2 and 3. The result tag may then be used for comparison purposes in each storage location 102T, as described above.

Additionally, a valid bit, shown here as V, is associated with the instruction, each operand, and the flags. For the operands/flags, the valid bit is set when the correct value of the operand/flag is loaded into storage location 102T, i.e. when the dependency has been satisfied for the given tag/flag. The valid bit for instruction 300 is set when the instruction is received from decoder 101 of FIG. 2, indicating that a valid instruction has been loaded into storage location 102T.

In the embodiment shown, location 304 is configured to store either the carry flag or overflow flag, or corresponding tag. Since the various instructions of the instruction set either read the carry or overflow flag exclusive of each other in this embodiment, only one storage location need be implemented for these two flags. This storage location is shared, and is configured to be used by only one of these flags at a given time. The flag, or corresponding tag, is received from reorder buffer 104 of via multiplexer 200, as shown in FIG. 3. Recall that reservation station 102 of FIGS. 2 and 3 includes a plurality of storage locations 102T. For those embodiments that are implemented in a superscalar microprocessor (as will be described below), multiple reservation stations may be present. Thus, by sharing dependency checking hardware for the carry and overflow flags, a savings of a significant number of comparators may result. For example, consider a processor which includes three reservation stations each including five storage locations, three functional units (each capable of conveying a result on the results bus), and a load/store unit (capable of concurrently conveying two results on the results bus). With three functional units and the load/store unit, up to five results may be conveyed on the results bus. Thus, it is possible that each operand/flag of each storage location 102T may have five comparators. With three reservation stations of five storage locations each, a savings of 75 comparators may result by combining dependency checking hardware for the carry and overflow flags.

Four flags, zero (Z), auxiliary (A), parity (P), and sign (S) are grouped together within storage location 102T.

Typically, an instruction that updates any one of these flags will update all of the flags in the embodiment shown. Each of these flags is stored in the reservation station for dependency checking purposes (in contrast to the carry and overflow flags, wherein only one of the two flags is stored).

In general, the technique described above may be applied to any instruction set architecture in which flags are used, wherein the reading of a certain flag by the instruction set is exclusive, or nearly exclusive, with respect to the reading of another flag by the instruction set.

Figure 5:
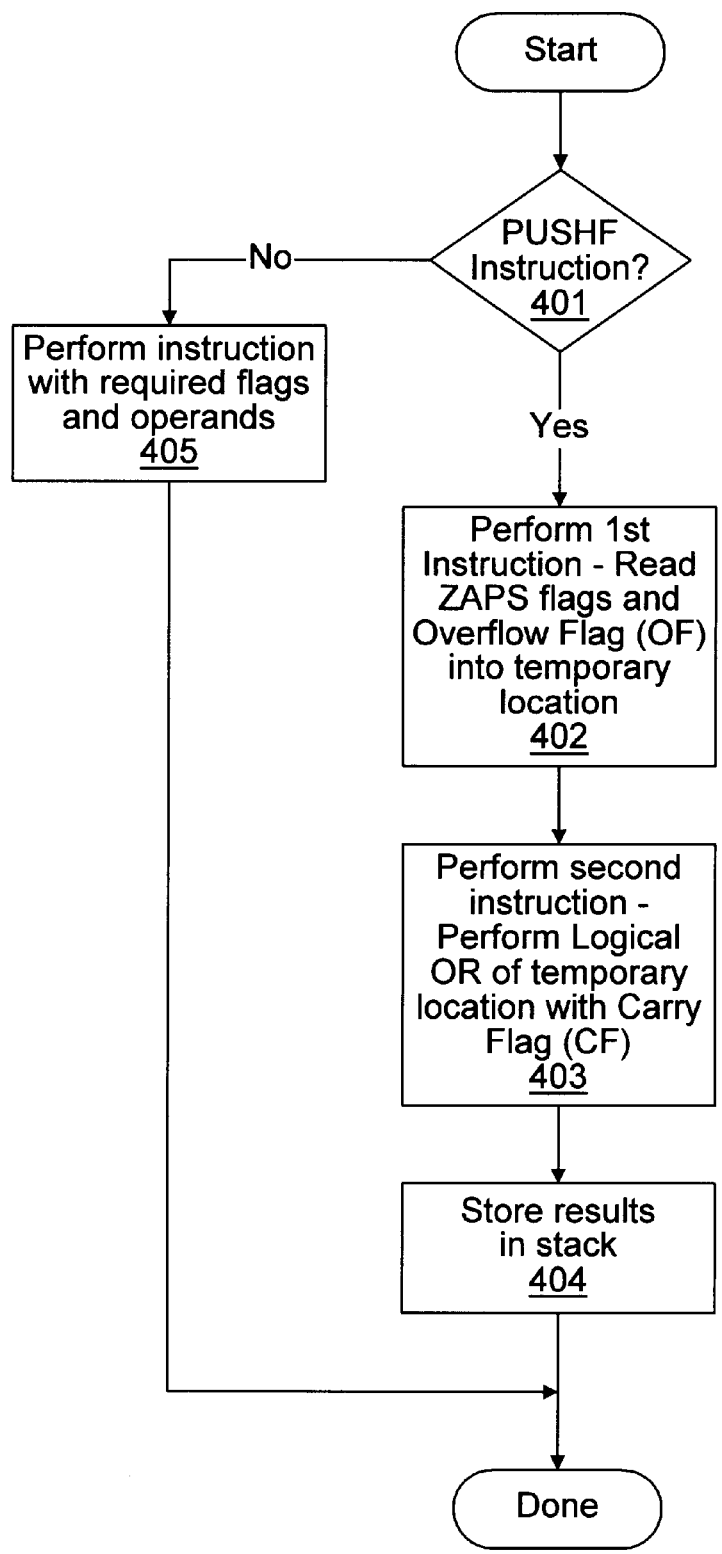
FIG. 5 is a flowchart illustrating dependency checking for two mutually exclusive status flags.

Turning now to FIG. 5, a flowchart illustrating one embodiment of dependency checking for two mutually exclusively read status flags is shown. The embodiment shown involves the reading of both the carry and overflow flags by the PUSHF (push flags) instruction of an x86 microprocessor. The PUSHF instruction directs the processor to write all status flags to a memory area known as the stack. In order to maintain the exclusivity of reading between the carry and overflow flag, the instruction may be broken down into two separate instructions using microcode. If a PUSHF instruction is decoded (block 401), all flags, including the carry and overflow flag are written to the stack. In block 402, all status flags, with the exception of the carry flag, are written into a temporary location by a first instruction. In block 403, a second instruction directs the processor to perform a logical OR operation of the carry flag with the remainder of the flags stored in a separate location. Following this operation, all status flags are written and stored in the stack (block 404). For all other instructions, the required operands and flags are used as normal (block 405). These instructions will either read at most one of the carry flag or overflow flag.

Figure 6:
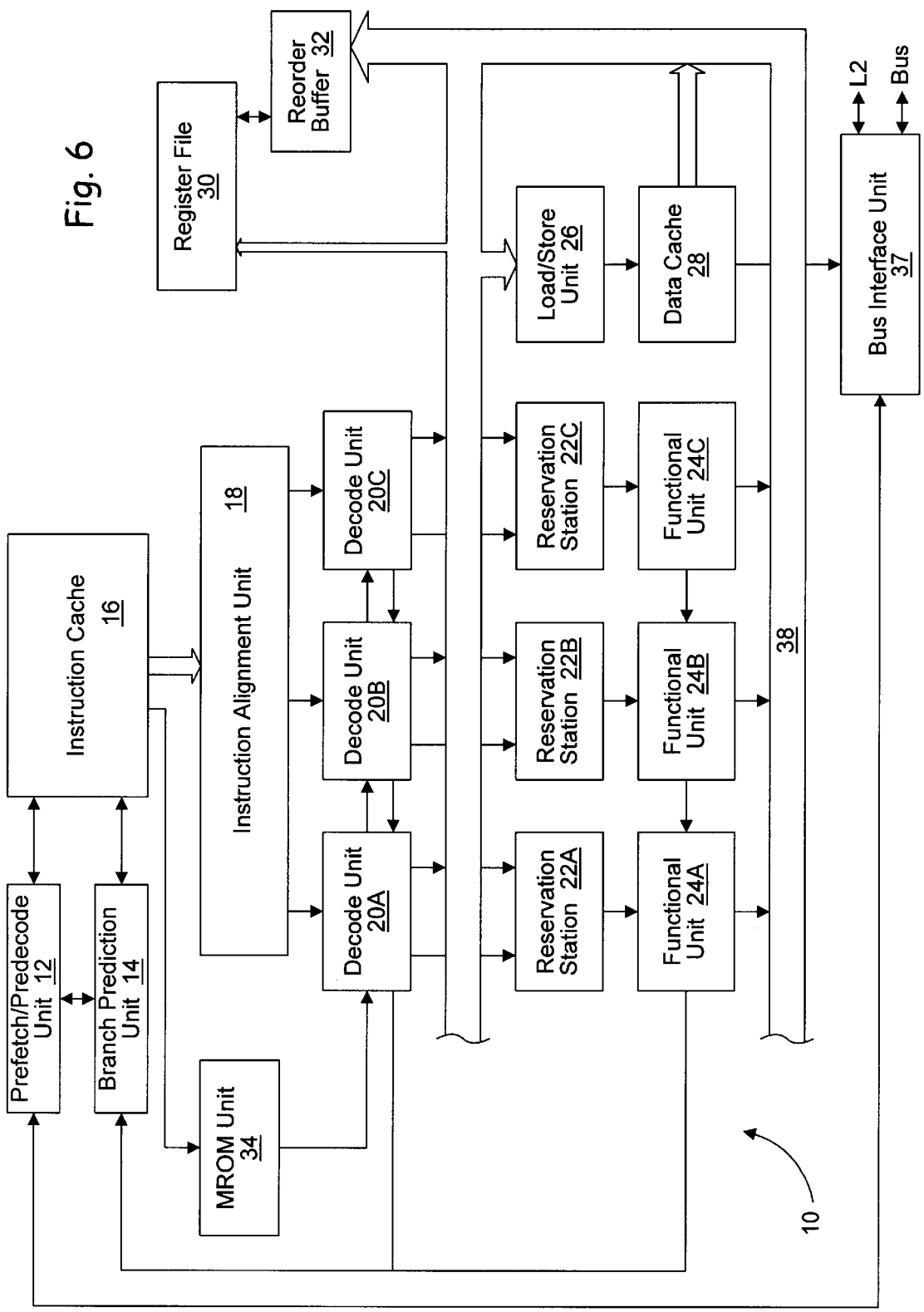
FIG. 6 is a block diagram of one embodiment of a pipelined superscalar microprocessor which may employ the technique of sharing dependency checking hardware for status flags; and, FIG. 7 is a block diagram of one embodiment of a computer system in which the microprocessor of FIG. 6 may be implemented.

Moving now to FIG. 6, a block diagram of one embodiment of a processor 10 is shown. Other embodiments are possible and contemplated. The processor may be configured to allow the technique of hardware sharing of status flags for dependency checking purposes as described above. As shown in FIG. 6, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

It should also be noted that decode units 20 are similar to decoder 101 of FIG. 2. Similarly, reservation stations 22 are similar to reservation station 102 of FIGS. 2 and 3, while functional units 24 are similar to functional unit 103 of FIG. 2. Reorder buffer 32 is similar to reorder buffer 104 of FIGS. 2 and 3, while register file 30 is similar to register file 106 of FIG. 2. Also note that results buses 38 may incorporate the results bus, flags results bus, and results tag bus of FIGS. 2, 3, and 4.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high-speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 6, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Turning now to FIG. 7, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integerated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 7) or may share CPU bus 224 with processor 10. Furthermore, processor 10a may be coupled to an optional L2 cache 228a similar to L2 cache 228.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A microprocessor comprising:

at least one reservation station;

a reorder buffer coupled to said reservation station, said reorder buffer configured to receive a first flag specifier indicating the use of either a first status flag as a source operand or a second status flag as a source operand, and wherein use of said first status flag as said source operand is exclusive of use of said second status flag as said source operand by an instruction receivable by said reservation station; and, wherein said reservation station includes circuitry for handling a dependency on one of said first status flag or said second status flag dependent on which of said first status flag or said second status flag is said source operand of said instruction.

2. The microprocessor as recited in claim 1, wherein said first status flag is a carry flag and said second status flag is an overflow flag.

3. The microprocessor as recited in claim 2, wherein an instruction set of said microprocessor includes a push flags instruction for writing status flags to a memory stack.

4. The microprocessor as recited in claim 3, wherein said microprocessor is configured to divide said push flags instruction into two instructions.

5. The microprocessor as recited in claim 4, wherein a first of said two instructions reads said carry flag and a second of said two instructions reads said overflow flag.

6. The microprocessor as recited in claim 1 further comprising a decode unit for decoding instructions, said decode unit coupled to said reservation station and said reorder buffer, wherein said decode unit is configured to forward at least one flag specifier including the first flag specifier and at least one operand specifier to said reorder buffer.

7. The microprocessor as recited in claim 6, wherein said decode unit is configured to provide an indication for dependency checking of either said first status flag or said second status flag.

8. The microprocessor as recited in claim 7, wherein dependency checking results for said first status flag or said second status flag are forwarded to said reservation station responsive to said indication from said decode unit.

9. The microprocessor as recited in claim 1, wherein said reservation station includes a plurality of entries, said entries comprising storage locations for source operands.

10. The microprocessor as recited in claim 9, wherein said storage locations are configured to store tags corresponding to said operands when dependencies for said operands have not been satisfied.

11. The microprocessor as recited in claim 10, wherein one of said storage locations is configured to store either said first status flag or corresponding tag or said second status flag or corresponding tag.

12. A method of operating a microprocessor comprising:

decoding an instruction;

dependency checking operands of said instruction, wherein said instruction operands include one of a first status flag or a second status flag, and wherein use of said first status flag as one of said instruction operands is exclusive with respect to use of said second status flag as one of said instruction operands, and, forwarding a result of said dependency checking for only one of said first status flag or said second status flag.

13. The method as recited in claim 12, wherein said first status flag is a carry flag and said second status flag is an overflow flag.

14. The method as recited in claim 13, further comprising detecting a push flags instruction for writing said status flags to a memory stack and dividing said push flags instruction into at least two instructions.

15. The method as recited in claim 14, wherein a first of said two instructions reads said carry flag and a second of said two instructions reads said overflow flag.

16. A microprocessor comprising:

a decode unit configured, in response to a first instruction having both a first status flag as a source operand and a second status flag as a source operand, to cause the first instruction to be divided into: (i) a second instruction having the first status flag as a source operand and not the second status flag; and (ii) a third instruction having the second status flag as a source operand and not the first status flag; and one or more execution units configured to execute the second instruction and the third instruction.

17. The microprocessor as recited in claim 16 wherein the first status flag is an overflow flag and the second status flag is a carry flag.

18. A microprocessor comprising:

a decode unit configured to decode an instruction; and a reservation station coupled to receive the instruction, the reservation station including a plurality of entries for storing instructions and operands, wherein a first entry of the plurality of entries is allocated to the instruction, and wherein the first entry includes a storage location configured to store either: (i) a first status flag or corresponding tag; or (ii) a second status flag or corresponding tag, wherein having the first status flag as a source operand of the instruction in the reservation station is exclusive of having the second status flag as a source operand.

19. The microprocessor as recited in claim 18 wherein the first status flag is an overflow flag and the second status flag is a carry flag.

20. The microprocessor as recited in claim 18 further comprising a dependency checking circuit coupled to receive an indication of one or more source operands of the instruction from the decode unit, wherein the dependency checking circuit is configured to forward a result of dependency checking either the first status flag or the second status flag to the reservation station dependent on which of the first status flag or the second status flag is the source operand of the instruction.

* * * * *